United States Patent [19]

Hardman

[11] Patent Number: 5,158,169
[45] Date of Patent: Oct. 27, 1992

[54] MAGNETIC DRUM ASSEMBLY AND METHOD FOR ORIENTING SIDE-BY-SIDE STEEL CAN BODIES

[75] Inventor: Allen D. Hardman, Hollister, Calif.
[73] Assignee: The Stolle Corporation, Sidney, Ohio
[21] Appl. No.: 765,028
[22] Filed: Sep. 24, 1991

Related U.S. Application Data

[63] Continuation-in-part of Ser. No. 255,629, Oct. 11, 1988, abandoned.

[51] Int. Cl.$^5$ .............................................. B65G 15/58
[52] U.S. Cl. ..................... 198/690.1; 198/472.1
[58] Field of Search .................... 198/690.1, 472.1, 408

[56] References Cited

U.S. PATENT DOCUMENTS

| | | | |
|---|---|---|---|
| 1,812,505 | 6/1931 | Wertz | 198/690.1 |
| 2,264,348 | 12/1941 | Weygant | 198/690.1 X |
| 2,845,165 | 7/1958 | Lopping | 198/690.1 X |
| 2,939,568 | 6/1960 | Israelson et al. | 198/690.1 |
| 2,992,736 | 7/1961 | Buus et al. | 209/223.1 |
| 3,338,374 | 8/1967 | Dudley | 198/41 |
| 3,447,663 | 6/1969 | Sarovich | 198/540 |
| 3,523,602 | 8/1970 | Mojden et al. | 198/690.1 X |
| 3,737,822 | 6/1973 | Buus et al. | 335/304 |
| 3,754,635 | 8/1973 | Mojden | 198/607 |
| 3,941,242 | 3/1976 | Braden | 198/690.1 X |
| 4,182,586 | 1/1980 | Lenhart | 406/87 |
| 4,337,856 | 7/1982 | Dorner | 198/599 |
| 4,456,406 | 6/1984 | Lenhart | 406/88 |

FOREIGN PATENT DOCUMENTS 0573406  10/1977  U.S.S.R.

OTHER PUBLICATIONS

Brochure of Eriez Magnetics, Magnamation Ideas, May 20, 1977.

Primary Examiner—Robert P. Olszewski
Assistant Examiner—James R. Bidwell
Attorney, Agent, or Firm—Glenn E. Klepac

[57] ABSTRACT

A drum assembly and method for conveying magnetically susceptible can bodies from a first location where the can bodies are generally vertical to a second location where the can bodies are generally horizontal. The drum assembly includes a hollow, non-magnetic, generally cylindrical drum; an axle for rotating the drum; and a fixed magnet inside the drum. Can bodies are attached to the drum outer surface portion by magnetic attraction at the first location; rotated to the second location; and separated from the drum at the second location by limiting proximity of the fixed magnet and the drum to an arc of only approximately 90°–110°.

19 Claims, 1 Drawing Sheet

5,158,169

MAGNETIC DRUM ASSEMBLY AND METHOD FOR ORIENTING SIDE-BY-SIDE STEEL CAN BODIES

PENDING RELATED APPLICATION

This application is a continuation-in-part of Hardman U.S. Ser. No. 255,629 filed Oct. 11, 1988, now abandoned.

TECHNICAL FIELD OF THE INVENTION

The present invention relates generally to the mass transport of articles, such as can-shaped containers, from a first location at a vertical orientation to a second location at a horizontal orientation. This invention can be most advantageously employed in removing steel can bodies from the surface of an air conveyor and then feeding the can bodies to an air single filer. Can damage is minimized while the device provides for metering the cans in a positive controlled fashion.

BACKGROUND OF THE INVENTION

In many manufacturing operations, particularly in the manufacture of cylindrical containers, such as two-piece steel cans, it is necessary to mass transport such articles, either in single file or side by side. Such containers are characteristically unstable, particularly at present-day line speeds which are capable of handling up to approximately 2,500 articles per minute.

Present-day two-piece steel cans possess can bodies having almost paper-thin side walls. During processing, the can bodies are caused to engage a number of work areas, including washing, decorating and necking stations. When moving from one station to the next, the can bodies either travel in a moving belt, or more advantageously, upon an air conveyor consisting of a plenum having openings for the directional supply of air from the upper deck surface. Devices of this nature are described in U.S. Pat. No. 4,456,406, the disclosure of which is incorporated herein by reference. However, it is often times necessary to change the vertical orientation of the can bodies as well as to convert the flow of cans from a multi-row configuration to a single file orientation, particularly when the can bodies are to be decorated and necked.

Air single filers, euphemistically known as doubling boxes, are well known in can processing operations. For example, one such device is disclosed in U.S. Pat. No. 4,182,586, the disclosure of which is hereby incorporated by reference. Conventionally, the input or upstream end of the air single filer would be fed by a waterfall which, as the name implies, simply consists of a curved slide which transcribes a circular drum across which cans travel while rotating 90° to achieve horizontal orientation at which point they fall into the upstream end of the single filer. A curved top guide surface prevents the cans from tumbling due to the small clearance between the guide and the top of the can.

The use of a waterfall in feeding a single filer, or in feeding any other device for that matter, possesses a number of inherent shortcomings. Quite obviously, the dropping of cans en masse from a waterfall to a lower collection area can and often times does result in damage being inflicted to the container side walls. This is a particular problem today as steel beverage containers have been provided with very thin side walls as a material saving expedient.

When the flow of container bodies was to be interrupted, prior waterfall installations would employ a gate which would physically impede the entrance to the single filer which, itself, often times causes can damage. The gate regulates can flow by capturing a row of cans laterally across the conveyer with a pressure pad that clamps the row of cans between the pad and the conveyor deck surface. When the gate is closed, the pad is applied which clamps the cans, thus stopping the flow. When the gate is open, the pad is released and the cans are free to move. The clamping action applies a force to the can bodies which can result in their damage. The sliding action of the cans through a prior waterfall can cause damage to the open end of the can as it slides on the top guide.

It is thus an object of the present invention to provide a drum assembly and its method of operation as a substitute for waterfall installations of the prior art.

It is a further object of the present invention to provide a drum assembly and its method of operation capable of rotating steel can bodies in side-by-side relationship from a first to a second location over a curved surface while avoiding damage to the can bodies and providing a positive means of flow control while avoiding gate structures employed by the prior art.

These and further objects will be readily apparent to persons skilled in the art from the following specification and claims.

SUMMARY OF THE INVENTION

The present invention deals with a drum assembly and its method of operation. The drum assembly provides for the rotation of a plurality of steel can bodies over a curved surface from a first to a second location. The device comprises a hollow, rotatable, cylindrical drum, capable of rotation about a substantially horizontal, longitudinally extending axle. A magnet assembly is located within the hollow, rotatable, cylindrical drum, said magnet assembly being of a size and placement to adhere the steel can bodies to the surface of the hollow, rotatable, cylindrical drum only from a first to a second location. Means are also provided for rotating the hollow, rotatable, cylindrical drum about the substantially horizontal, longitudinally extending axle.

As used herein, the terms "steel can bodies," "magnetically susceptible can bodies," and "ferrous can bodies" are expressions for the objects which are conveyed by the drum assembly of the present invention. The can bodies are usually hollow and generally cylindrical but may have other shapes as well.

DETAILED DESCRIPTION OF THE INVENTION

Figure 1:
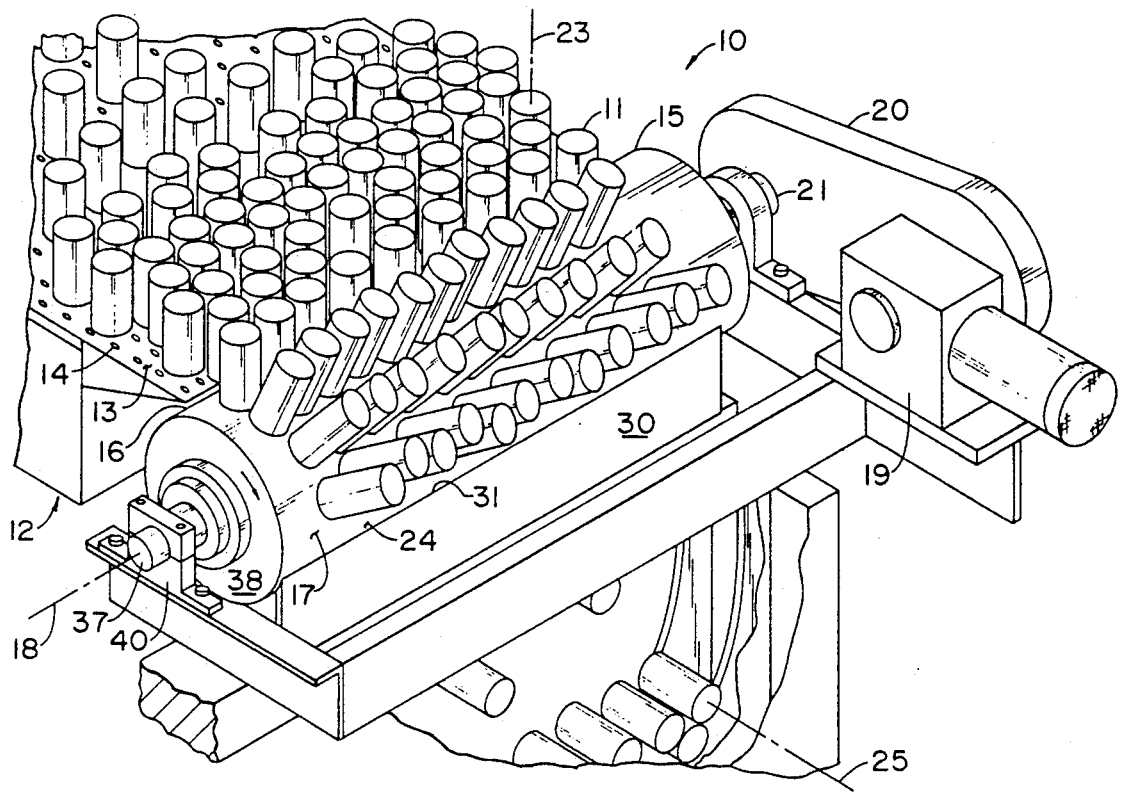
FIG. 1 is a perspective view of the drum assembly of the present invention.

FIG. 1 illustrates the magnetic drum assembly 10 of the present invention in operation. Magnetically susceptible can bodies or steel can bodies or steel cans 11 are moved along an air conveyor 12 on its top surface 13 by the directional flow of air through openings 14. The cans 11 thereupon engage a hollow, rotatable, cylindrical drum 15 at a first location 16 and are adhered to an outer surface portion or outer surface 17 of the cylindrical drum 15 by virtue of a fixed magnet, the details of which will be discussed hereinafter.

The hollow, rotatable, cylindrical drum 15 is caused to rotate about a substantially horizontal, longitudinal axis 18 by virtue of a variable speed motor (not shown). The motor drives a gear assembly 19 which, in turn, is coupled to a roller chain contained within a roller chain housing 20. The roller chain engages a rotatable axle or shaft 21 (FIG. 3) causing rotation of hollow, rotatable, cylindrical drum 15 through bearings 22.

Figure 2:
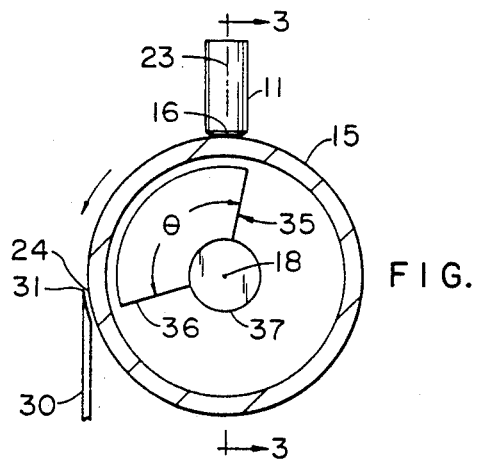
FIG. 2 is a fragmentary cross-sectional side view of the magnetic drum assembly of the present invention.

It is an essential element of the present invention to provide a configuration whereby steel can bodies 11 are to be maintained by means of a magnetic assembly on the outer surface 17 of rotating, cylindrical drum 15 only in a specific predetermined arc of rotation, such as shown in FIG. 2. Ideally, the arc of rotation is approximately 90° whereby the steel cans 11 are received from the top surface 13 of air conveyor 12 at a first location 16.

Referring again to FIGS. 1 and 2, cans 11 are to be received from horizontal surface 13 having a substantially vertical axis 23. The steel cans 11 are then caused to adhere to the outer surface 17 of rotating cylindrical drum 15 until they reach a second location 24 where their collective longitudinal axes 25 are substantially horizontal. At that point, the influence of the magnetic assembly diminishes and the cans 11 fall from the surface portion 17 of rotating drum 15. To further facilitate removal, an optional stripper plate 30 can be positioned adjacent to the outer surface portion 17 of cylindrical drum 15. The stripper plate 30 has a blade 31 extending tangentially to the outer surface portion 17 near the second location 24. Although in most instances, gravitational attraction applied to the steel cans 11 is sufficient to insure their discharge from the rotating, cylindrical drum's outer surface 17, the stripper plate blade 31 insures can removal substantially at the second location 24.

Figure 3:
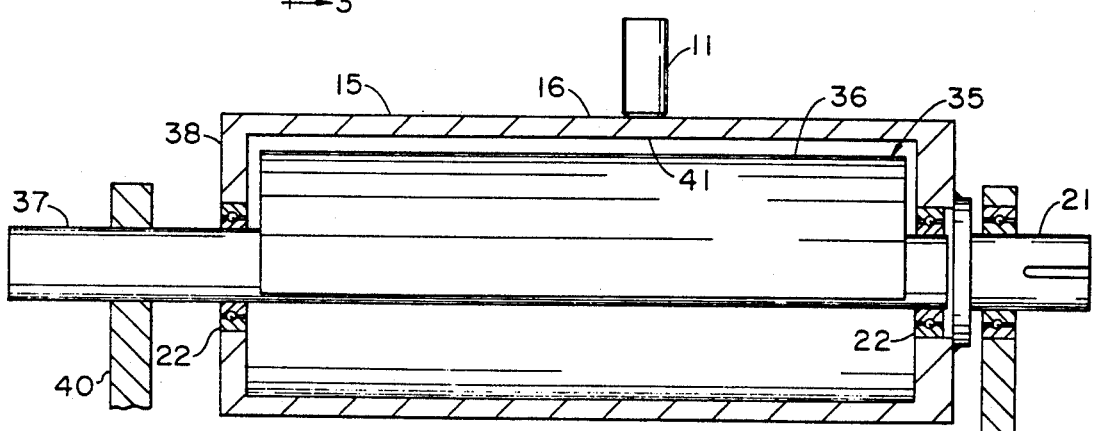
FIG. 3 is a partial cross-sectional view taken at an angle of 90° to the view of FIG. 2.

The above-described apparatus also includes a magnetic assembly 35 as shown in FIGS. 2 and 3. The magnetic assembly 35 includes a fixed magnet 36 supported by a support shaft 37 extending laterally through bearings 22 in an end wall 38 of the drum 15. The support shaft 37 is attached to a fixed stand 40 located exteriorly of the drum 15. The fixed magnet 36 extends proximal to an inner wall 41 of the drum 15 along an arc defined by angle θ to be between approximately 90° and 110°.

It is further to be noted that the drum assembly 10 of the present invention can also act to regulate the flow of can-shaped objects as an alternative to gate structures of the prior art. As can-shaped objects 11 move from the air conveyor 12, they are captured by magnetic attraction onto the surface 17 of rotatable, cylindrical drum 15. If the cylindrical drum 15 stops rotating, the flow of can-shaped objects 11 also stops as line pressure from air conveyor 12 is not generally of sufficient strength to override the inertia of cans 11 and to slide the cans 11 onto the surface 17 of rotating drum 15. As such, the present invention advantageously replaces the typical prior art gate and waterfall devices. Where gates of the prior art are either open or closed, the rate of travel of the present drum assembly can be adjusted over a wide range extending from zero to a predetermined maximum speed.

Today's high-speed, can-handling processing lines require continuous flow regulation with a rapid response time. Intermittent flow produced by a gate is not adequate because the response time of a mass of can-shaped objects is slow due to the inertia of the pack. The present invention provides for such continuous flow regulation with a response time unmatched by prior art devices.

It is an important feature of the present invention that steel cans are reoriented from a vertical position to a horizontal position without need for attachment to a moving magnetic belt conveyor, as in Dudley U.S. Pat. No. 3,338,374. The beltless conveyor of the present invention avoids problems of reliability and wear involved with moving belts, both on the cylindrical drum 15 and at adjacent positions. The invention also moves a much higher volume of steel cans per unit time by taking advantage of a long drum outer surface 17 accommodating a plurality of cans 11 in side-by-side relationship. As shown in FIG. 1, the present apparatus easily transports at least six and even more than ten steel cans across the length of the drum 15. In contrast, Dudley's conveyor carries can bodies in single file on moving, magnetic belt. The Dudley patent also fails to suggest any means for releasing can bodies from the magnetic belt when the can bodies are in horizontal orientation.

While the invention has been described in terms of preferred embodiments, the claims appended hereto are intended to encompass all embodiments which fall within the spirit of the invention.

What is claimed is:

1. A method for conveying a multiplicity of magnetically susceptible can bodies from a first location where the can bodies are generally vertically oriented to a second location where the can bodies are generally horizontally oriented, said method comprising steps of:
   (a) feeding a multiplicity of generally vertically oriented, magnetically susceptible can bodies onto a curbed outer surface portion of a hollow, non-magnetic, generally cylindrical drum that is rotatable about a generally horizontal axle, said can bodies being fed onto said outer surface portion at a first location above said horizontal axle, said multiplicity of can bodies including at least a plurality in generally side-by-side relationship extending longitudinally across said outer surface portion of said drum;
   (b) magnetically attaching said can bodies to said outer surface portion of the drum by attraction of a fixed, non-rotatable magnetic assembly inside the drum and including a fixed magnet adjacent an inner surface portion of the drum opposed to said outer surface portion, said fixed magnet being proximal to said inner surface portion between said first location and a second location spaced radially from said first location by an arc of approximately 90°–110° in a direction of rotation of said drum, there being no cable or belt rotating around said drum;
   (c) rotating said drum radially around said horizontal axle, thereby transporting said can bodies from the first location to a second location where the can bodies are generally horizontally oriented;
   (d) separating said multiplicity of can bodies from said outer surface portion of said drum at a point spaced from the first location by an arc of about 90°–110° so that said can bodies are no longer sufficiently magnetically attracted to said fixed magnet that they remain attached to the drum, said can bodies being generally horizontally oriented when separated from said drum.

2. The method of claim 1 wherein step (d) comprises rotating said drum approximately 90°.

3. The method of claim 1 where said can bodies are neither fed to the first location nor carried away from the second location by a belt attached to said drum.

4. The method of claim 1 wherein said drum has sufficient length to accommodate at least six can bodies in side-by-side relationship.

5. The method of claim 1 wherein said drum has sufficient length to accommodate more than ten can bodies in side-by-side relationship.

6. The method of claim 1 further comprising:
(e) transporting said can bodies along a top surface of an air conveyor to said first location, by directional flow of air through a plurality of openings in said top surface toward said first location.

7. The method of claim 6 wherein said can bodies are vertically oriented on said top surface of the air conveyor.

8. The method of claim 1 wherein step (d) further comprises:
(1) contacting said cans with a generally vertical stripper plate having a blade extending tangentially to said outer surface portion of the drum proximal to said second location.

9. The method of claim 1 wherein step (d) comprises separating said generally horizontally oriented can bodies from said drum by gravitational force.

10. The method of claim 1 wherein said magnetically susceptible can bodies are steel can bodies.

11. A drum assembly for conveying magnetically susceptible can bodies from a first location where the can bodies are generally vertically oriented to a second location where the can bodies are generally horizontally oriented comprising:
(a) a hollow, non-magnetic, generally cylindrical drum having a curved outer surface portion spaced radially outwardly of a generally horizontal axle, said outer surface portion being sufficiently long to accommodate at least a plurality of can bodies in generally side-by-side relationship, there being no belt or cable rotating around said drum;
(b) a generally horizontal axle attached to said drum, said drum being rotatable about said horizontal axle;
(c) means for rotating said drum radially about said axle; and
(d) a magnetic assembly for attaching can bodies to said outer surface portion, said magnetic assembly including a fixed magnet inside the drum proximal to an inner surface portion of the drum opposed to said outer surface portion, said fixed magnet being proximal to said inner surface portion between a first location above said axle and a second location spaced radially of said first location by an arc of approximately 90°–110° in a direction of rotation of said drum;
whereby magnetically susceptible generally vertically oriented can bodies fed to said first location are attached to said outer surface portion, rotated to said second location, and separated from said outer surface portion at said second location where they are generally horizontally oriented.

12. The drum assembly of claim 11 wherein said second location is spaced radially of said first location by an arc of approximately 90°.

13. The drum assembly of claim 11 further comprising:
(e) a generally vertical stripper plate having a blade extending tangentially to said outer surface portion of the drum proximal to said second location.

14. The drum assembly of claim 11 wherein said magnetic assembly further comprises:
(1) a laterally extending support shaft supporting the fixed magnet inside the drum, said support shaft extending exteriorly of the drum.

15. The drum assembly of claim 14 wherein said magnetic assembly further comprises:
(2) a fixed stand located outside the drum, said support shaft being attached to said fixed stand.

16. The drum assembly of claim 11 wherein said means for rotating said drum comprises a variable speed motor.

17. The drum assembly of claim 11 wherein said drum has sufficient length to accommodate at least six can bodies in side-by-side relationship.

18. The drum assembly of claim 11 wherein said drum has sufficient length to accommodate more than ten can bodies in side-by-side relationship.

19. The drum assembly of claim 11 wherein said outer surface portion of the drum is ungrooved.

* * * * *